United States Patent
Parkar et al.

(10) Patent No.: US 12,465,316 B2
(45) Date of Patent: Nov. 11, 2025

(54) METHOD AND SYSTEM FOR POSITIONING AN IMAGING SYSTEM

(71) Applicant: Medtronic Navigation, Inc., Lafayette, CO (US)

(72) Inventors: Rasika A. Parkar, Wayland, MA (US); Xavier Tomas Fernandez, Medford, MA (US); Xiaodong Tao, Westwood, MA (US); Nikita Pandey, Broomfield, CO (US); Patrick A. Helm, Canton, MA (US); Dany Junio, Brookline, MA (US)

(73) Assignee: Medtronic Navigation, Inc., Lafayette, CO (US)

( * ) Notice: Subject to any disclaimer, the term of this patent is extended or adjusted under 35 U.S.C. 154(b) by 196 days.

(21) Appl. No.: 18/141,131

(22) Filed: Apr. 28, 2023

(65) Prior Publication Data
US 2024/0358343 A1    Oct. 31, 2024

(51) Int. Cl.
*A61B 6/00* (2024.01)
*A61B 6/58* (2024.01)

(52) U.S. Cl.
CPC ............... *A61B 6/547* (2013.01); *A61B 6/56* (2013.01); *A61B 6/582* (2013.01)

(58) Field of Classification Search
CPC ...... A61B 2034/107; A61B 2034/2051; A61B 2034/2055; A61B 2034/2072; A61B 34/20; A61B 6/469; A61B 6/545; A61B 6/547

See application file for complete search history.

(56) References Cited

U.S. PATENT DOCUMENTS

| | | |
|---|---|---|
| 8,238,631 B2 | 8/2012 | Hartmann et al. |
| 9,411,057 B2 | 8/2016 | Helm et al. |
| 9,807,860 B2 | 10/2017 | Helm et al. |
| 10,881,371 B2 | 1/2021 | Helm et al. |
| 11,071,507 B2 | 7/2021 | Helm et al. |
| 11,135,025 B2 | 10/2021 | Snyder et al. |
| 11,138,768 B2 | 10/2021 | Helm et al. |
| 11,213,357 B2 | 1/2022 | Helm et al. |
| 11,344,268 B2 | 5/2022 | Garlow et al. |
| 2010/0228117 A1 | 9/2010 | Hartmann |
| 2017/0316561 A1* | 11/2017 | Helm .................. G06F 3/04817 |
| 2018/0092699 A1 | 4/2018 | Finley |
| 2018/0289428 A1 | 10/2018 | Lee et al. |
| 2019/0038365 A1 | 2/2019 | Soper et al. |
| 2021/0251591 A1 | 8/2021 | Johnson |
| 2022/0284602 A1 | 9/2022 | Helm et al. |

(Continued)

FOREIGN PATENT DOCUMENTS

WO    2024047630 A1    3/2024

OTHER PUBLICATIONS

International Search Report and Written Opinion for related International Application No. PCT/US2024/026488; Date of Mailing: Jul. 30, 2024; 17 pages.

(Continued)

*Primary Examiner* — Dani Fox

(57) ABSTRACT

A method and system are disclosed for analyzing image data of a subject and/or operating and moving an imaging system to obtain image data. The image data can be collected with an imaging system in a selected manner and/or motion. An automatic system and method may define or identify positions for image data acquisition.

18 Claims, 9 Drawing Sheets

(56) References Cited

U.S. PATENT DOCUMENTS

2022/0301199 A1    9/2022  Tomas Fernandez et al.
2022/0346886 A1   11/2022  Soper et al.
2022/0378521 A1*  12/2022  Turgeman .............. A61B 34/25

OTHER PUBLICATIONS

International Search Report and Written Opinion for related International Application No. PCT/US2024/026499; Date of mailing: Aug. 16, 2024; 18 pages.
International Search Report and Written Opinion for related International Application No. PCT/US2024/026471; Date of Mailing: Jul. 30, 2024; 16 pages.

* cited by examiner

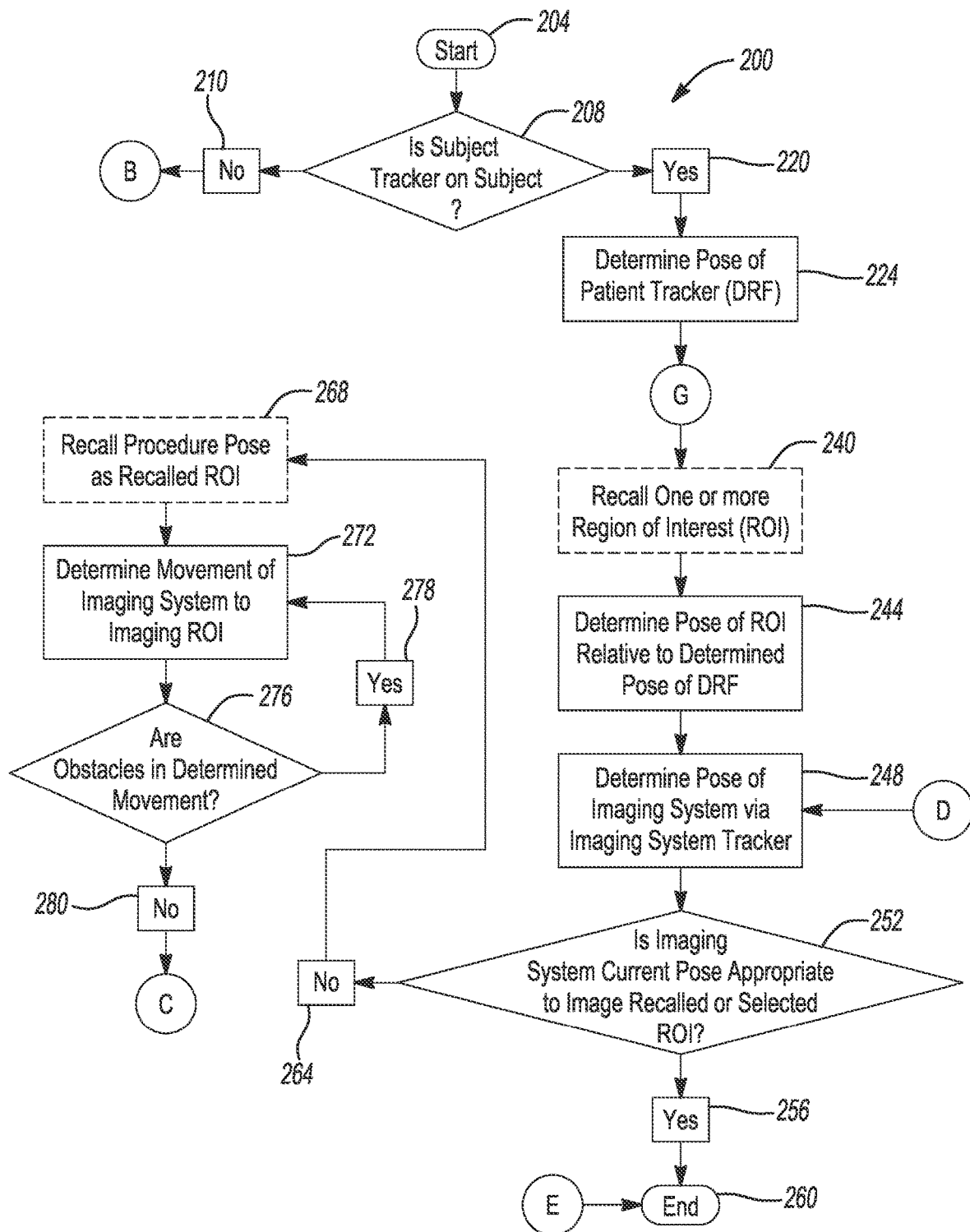
FIG. 5A₁

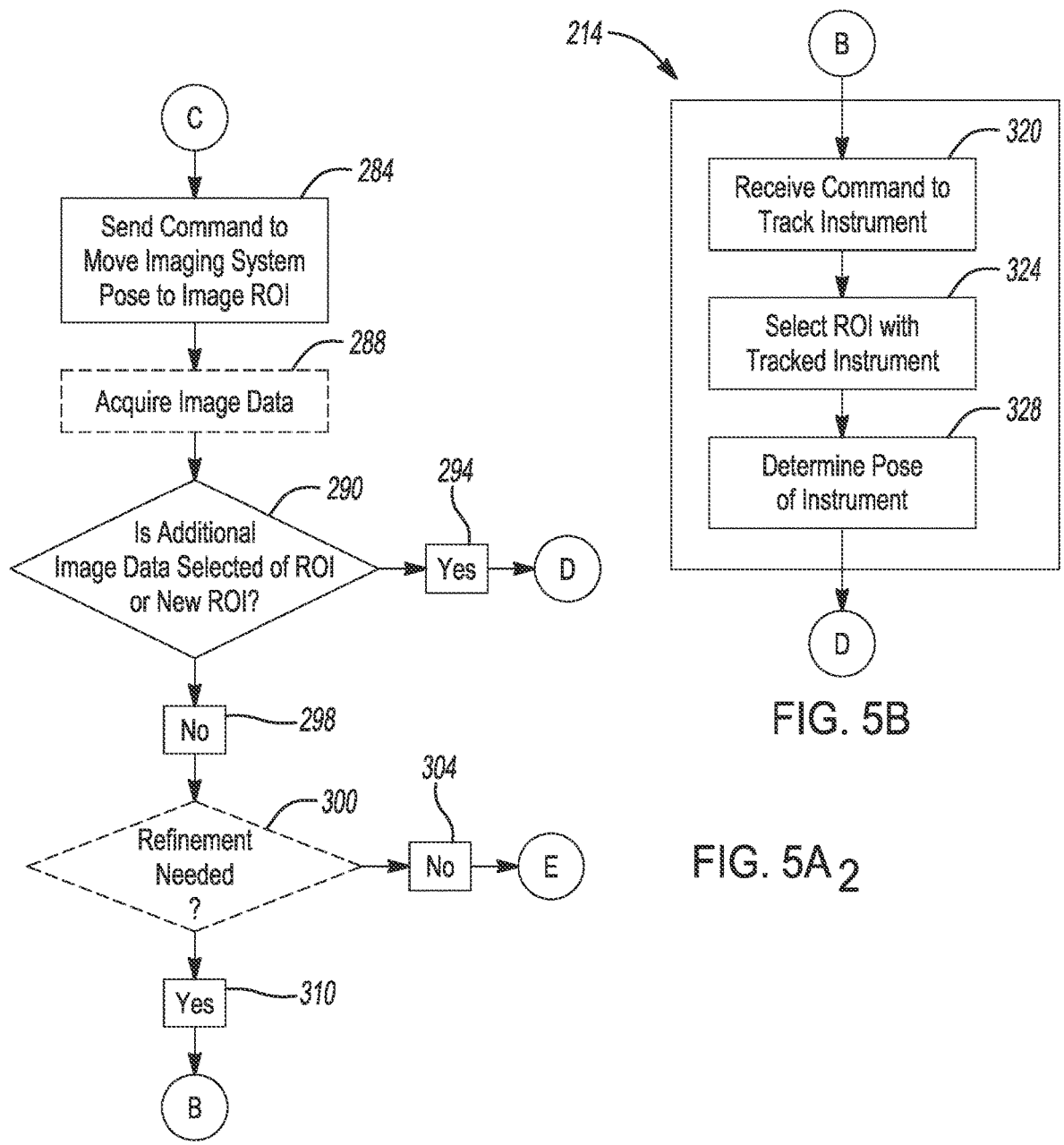
FIG. 5A₂
FIG. 5B
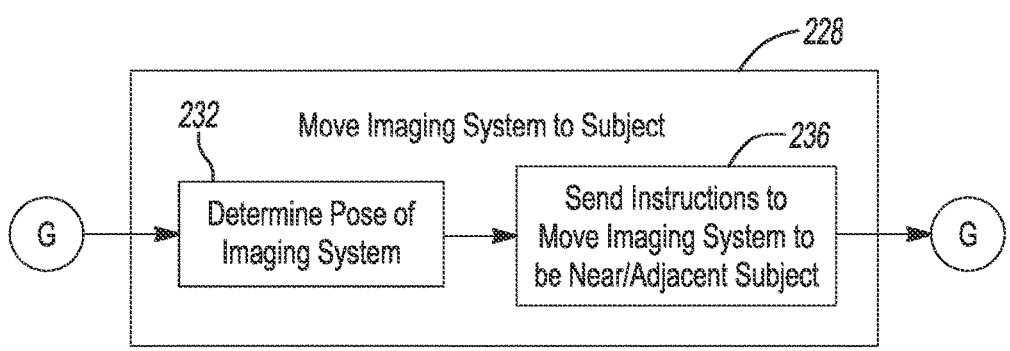

METHOD AND SYSTEM FOR POSITIONING AN IMAGING SYSTEM

CROSS-REFERENCE TO RELATED APPLICATIONS

The subject matter of this application relates to the subject matter of concurrently filed U.S. patent application Ser. No. 18/141,028 and U.S. patent application Ser. No. 18/141,062. The entire disclosure of the above applications are incorporated herein by reference.

FIELD

The present disclosure relates to an imaging system, and particularly to a system and method to move the imager to a selected position, including automatically moving.

BACKGROUND

This section provides background information related to the present disclosure which is not necessarily prior art.

A subject, such as a human patient, may undergo a procedure. The procedure may include a surgical procedure to correct or augment an anatomy of the subject. The augmentation of the anatomy can include various procedures, such as movement or augmentation of bone, insertion of an implant (i.e., an implantable device), or other appropriate procedures.

When using an imager, positioning the imager in a location to align the anatomical volume into the scan volume is important. Reducing the amount of time to position the imager and therefore reducing the amount of radiation to a patient is also important. Typically, a technician tries to manually position the imager by looking at a two-dimensional image. Using trial and adjustment, the technician adjusts the position of the imager until the desired image is obtained.

SUMMARY

This section provides a general summary of the disclosure, and is not a comprehensive disclosure of its full scope or all of its features.

According to various embodiments, a system to acquire image data of a subject may be an imaging system that uses x-rays. The subject may be a living patient (e.g., a human patient). The subject may also be a non-living subject, such as an enclosure, a casing, etc. Generally, the imaging system may acquire image data of an interior of the subject. The imaging system may include a moveable source and/or detector that is moveable relative to the subject. The position and movement of the system is performed automatically to reduce the overall imaging time and provide less exposure of x-rays to the subject. In various embodiments, a method and system for positioning an imaging system includes positioning the imaging system, acquiring a first image, detecting a first body structure in the first image, determining a first position of the imaging system relative to the first body structure based on the first image, determining a distance to a target image position based on the relative position, and moving the imaging system toward the target image position.

In another aspect of the disclosure, a system to move an imaging system is disclosed. A controller configured to execute instructions to move the imaging system and/or acquire position information of at least the imaging system and a portion of the subject to be imaged is disclosed. The controller may include a processor or processor module, as discussed herein, configured to determine a position and/or acquire position information. The position information may be used to determine a type, amount, and parameters of movement of the imaging system to acquire a selected image.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
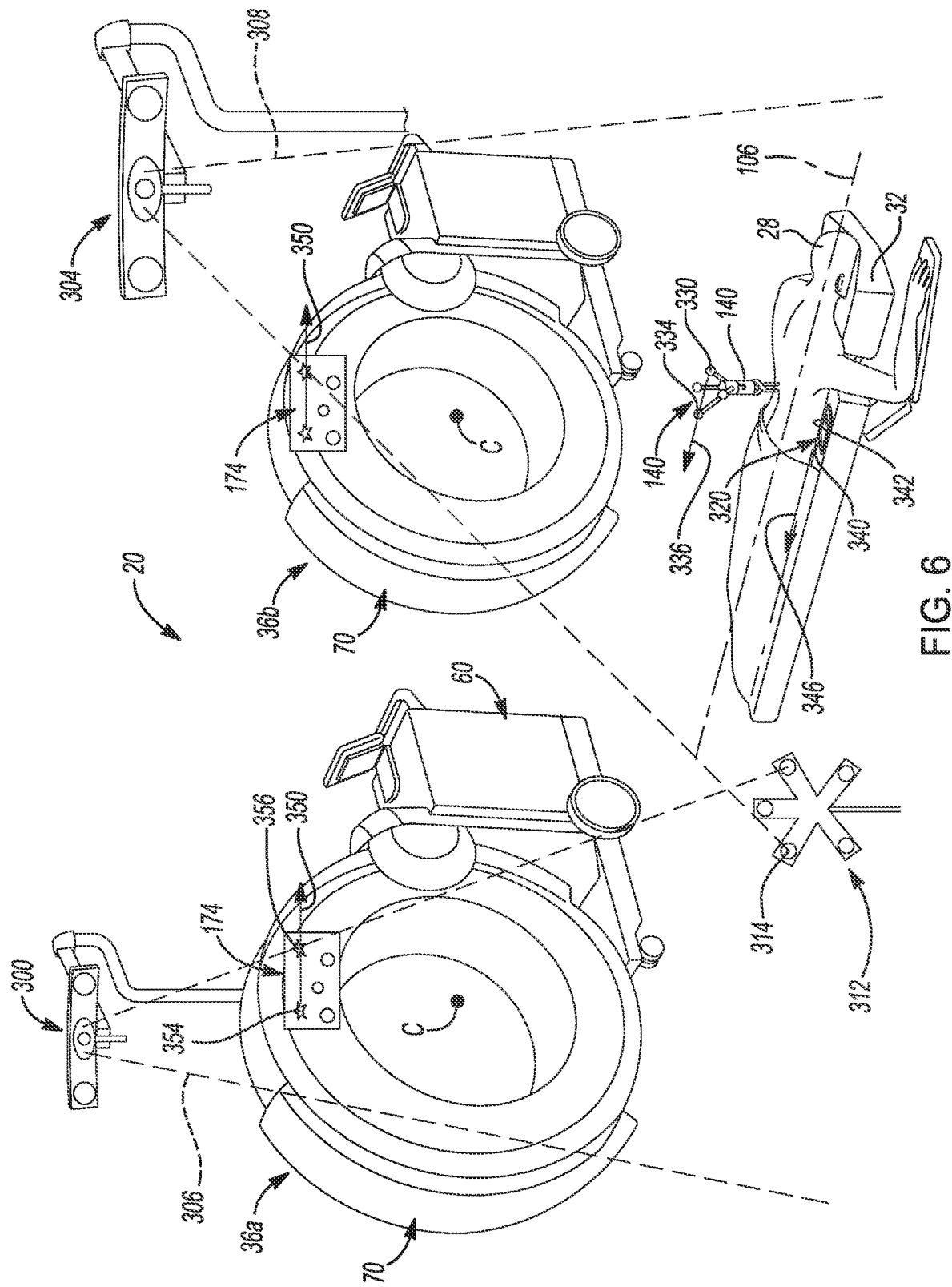
Figure 7:
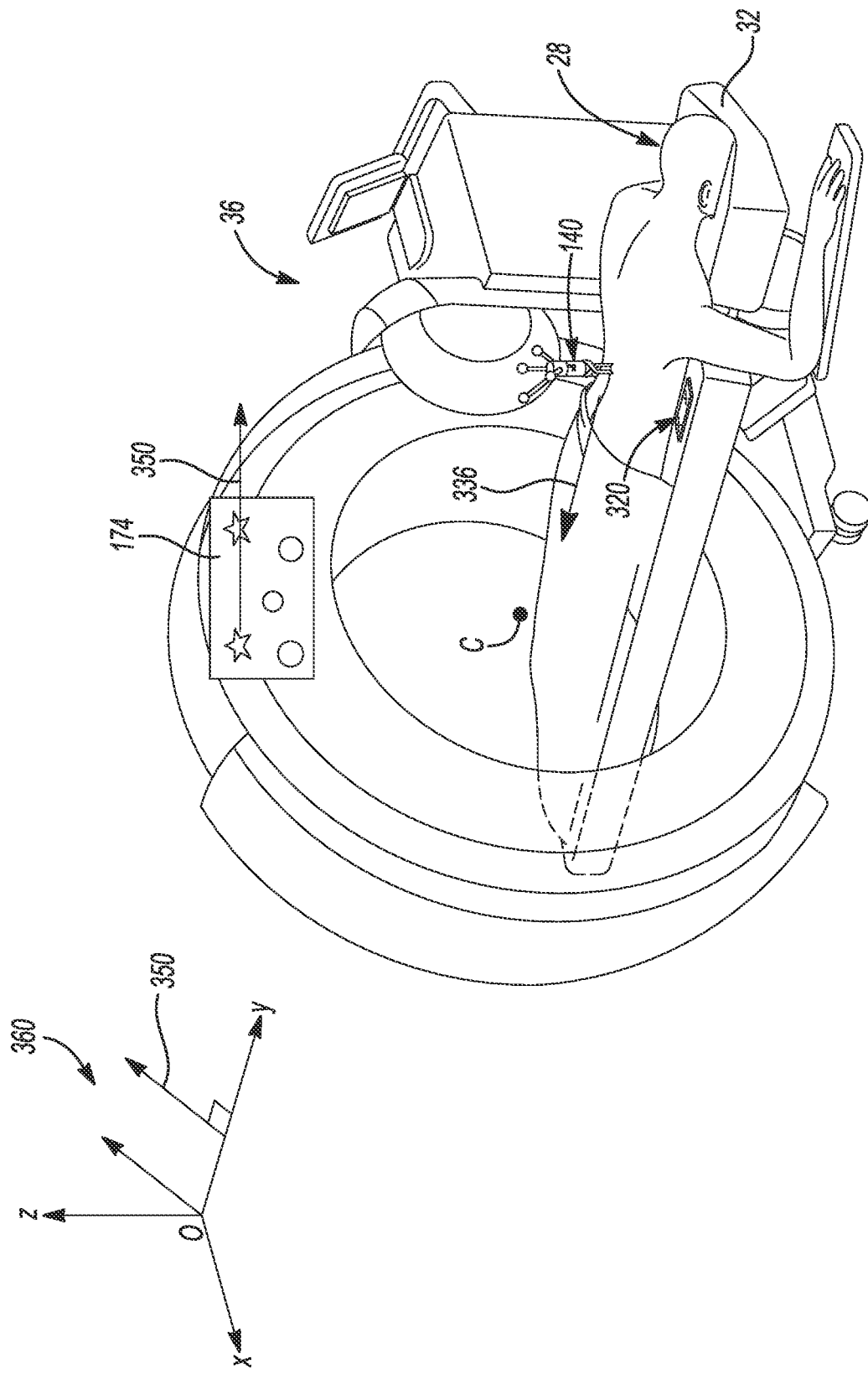
Figure 8:
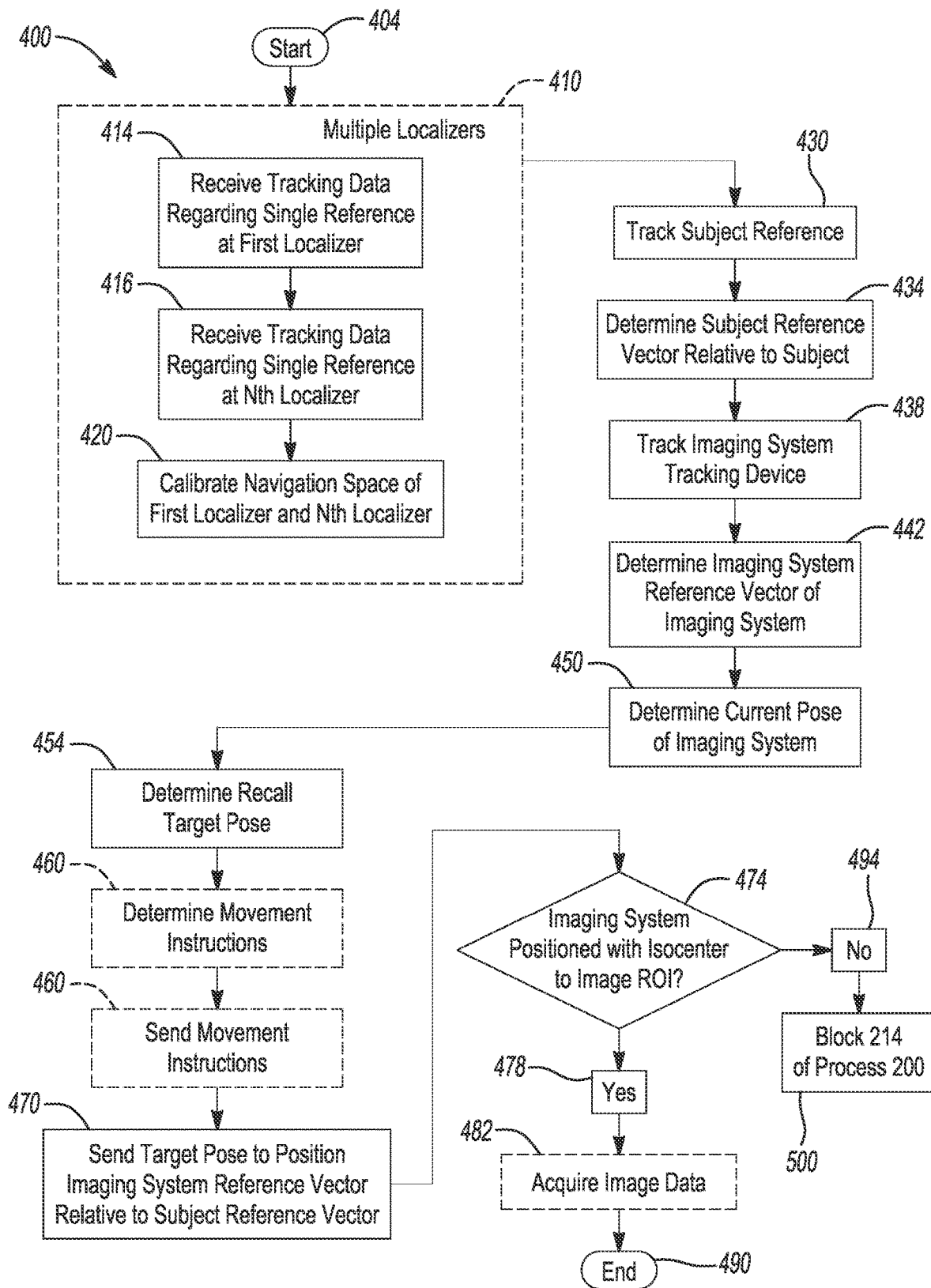

FIG. 5A1, 5A2, and FIG. 5B are flowcharts of operations of an imaging and tracking system, according to various embodiments;

FIG. 6 is an environmental view of an imaging system in various poses and a navigation system, according to various embodiments;

FIG. 7 is an environmental view of an imaging system in a selected target position, according to various embodiments; and FIG. 8 is a flow chart of a process of moving the imaging system, according to various embodiments.

Corresponding reference numerals indicate corresponding parts throughout the several views of the drawings.

DETAILED DESCRIPTION

Example embodiments will now be described more fully with reference to the accompanying drawings.

A subject may be imaged with an imaging system, as discussed further herein. The subject may be a living subject, such as a human patient. Image data may be acquired of the human patient and may be combined to provide an image of the human patient that is greater than any dimension of any single projection acquired with the imagining system. It is understood, however, that image data may be acquired of a non-living subject, such an inanimate subject including a housing, casing, interior of a super structure, or the like. For example, image data may be acquired of an airframe for various purposes, such as diagnosing issues and/or planning repair work.

Further, the image data may be acquired having a plurality of projections that may be generated by dividing a single projection area into a plurality of projections. As discussed further herein, an imaging system may include a filter or construct that divides a beam, such as an x-ray cone beam, into a plurality of portions (e.g., fans). Each of the fans may be used to acquire image data of the subject at a single position, but due to the division of a cone into a plurality of distinct portions, such as fans, a single cone projection may include a plurality of projections due to the fans.

Figure 1:
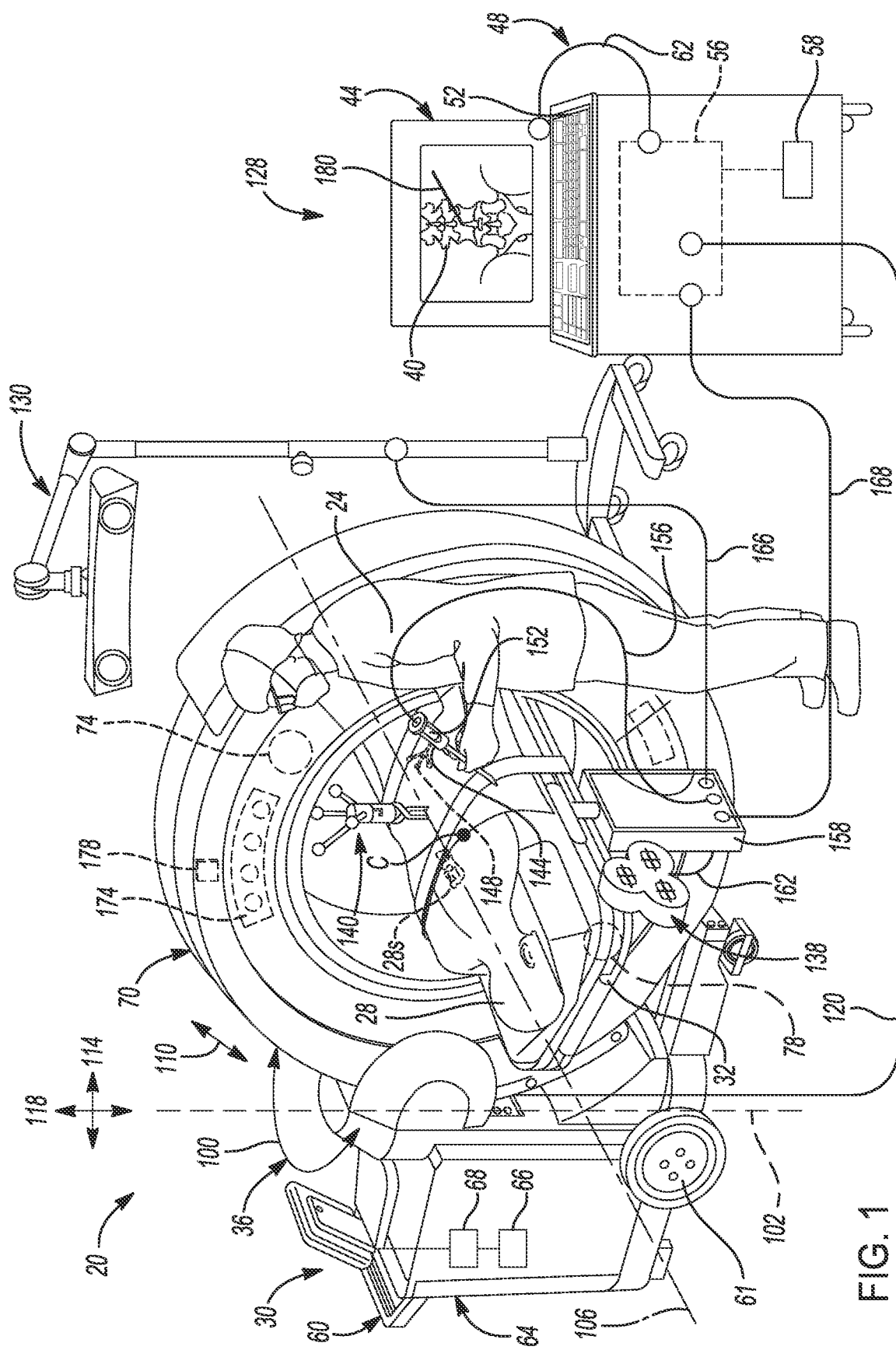
FIG. 1 is an environmental view of an imaging system in an operating theatre.

With reference to FIG. 1, a schematic view of a procedure room 20 is illustrated. A user 24, such as a surgeon, can perform a procedure on a subject, such as a patient 28. The subject may be placed on a support, such as a table 32 for a selected portion of the procedure. The table 32 may not interfere with image data acquisition with an imaging system 36. In performing the procedure, the user 24 can use the imaging system 36 to acquire image data of the patient 28 to allow a selected system to generate or create images to assist in performing a procedure. Images generated with the image data may be two-dimensional (2D) images, three-dimensional (3D), or appropriate type of images, such as a model (such as a three-dimensional (3D) image), long views, single projections views, etc. can be generated using the image data. Also, four dimensional (4D) images may be images that are generated based on image data collected over time. For example, several images of a beating heart. The several images may be displayed as a sine. The image(s), according to various embodiments, may be displayed as an image 40 on a display device 44.

The display device 44 can be part of and/or connected to a processor system 48 that includes an input device 52, such as a keyboard, and a processor 56, which can include one or more processors, processor module, and/or microprocessors incorporated with the processing system 48 along with selected types of non-transitory and/or transitory memory 58. A connection 62 can be provided between the processor 56 and the display device 44 for data communication to allow driving the display device 44 to display or illustrate the image 40. The processor 56 may be any appropriate type of processor such as a general-purpose processor that executes instructions included in a program or an application specific processor such as an application specific integrated circuit.

The imaging system 36 can include an O-Arm® imaging system sold by Medtronic Navigation, Inc. having a place of business in Louisville, CO, USA. The imaging system 36, including the O-Arm® imaging system, or other appropriate imaging systems may be in use during a selected procedure, such as the imaging system described in U.S. Pat. Nos. 8,238,631; 9,411,057; and 9,807,860, all the above incorporated herein by reference. Further, the imaging system may include various features and elements, such as a slotted filter, such as that disclosed in U.S. Pat. No. 10,881,371 to Helm et al. and U.S. Pat. No. 11,071,507 to Helm et al., all the above incorporated herein by reference.

The imaging system 36, when, for example, including the O-Arm® imaging system, may include a mobile cart 60 that includes a controller and/or control system 64. The control system 64 may include a processor and/or processor system 66 (similar to the processor 56) and a memory 68 (e.g., a non-transitory memory). The memory 68 may include various instructions that are executed by the processor 66 to control the imaging system 36, including various portions of the imaging system 36.

The imaging system 36 may include further additional portions, such as an imaging gantry 70 in which is positioned a source (also referred to as a source assembly or unit) 74 and a detector (also referred to as a detector assembly or unit) 78. In various embodiments, the detector 78 alone and/or together with the source may be referred to as an imaging head of the imaging system 36. The gantry 70 is moveably connected to the mobile cart 60. The gantry 70 may be O-shaped or toroid shaped, wherein the gantry 70 is substantially annular and includes walls that form a volume in which the source unit 74 and detector 78 may move. The mobile cart 60 may also be moved. In various embodiments, the gantry 70 and/or the cart 60 may be moved while image data is acquired, including both being moved simultaneously. Also, the imaging system 36 via the mobile cart 60 can be moved from one operating theater to another (e.g., another room). The gantry 70 can move relative to the cart 60, as discussed further herein. This allows the imaging system 36 to be mobile and moveable relative to the subject 28, thus allowing it to be used in multiple locations and with multiple procedures without requiring a capital expenditure or space dedicated to a fixed imaging system. The imaging system 36 may move, including the cart 60 and the gantry 70 and the imaging portion. Movement of the mobile cart 60 may include movement systems and controls such as those disclosed in U.S. Pat. No. 11,344,268, incorporated herein by reference.

The processor 66 may be a general-purpose processor or an application specific application processor. The memory system 68 may be a non-transitory memory such as a spinning disk or solid-state non-volatile memory. In various embodiments, the memory system may include instructions to be executed by the processor 66 to perform functions and determine results, as discussed herein.

In various embodiments, the imaging system 36 may include an imaging system that acquires images and/or image data using x-rays that are emitted and detected. The image data is generated after interactions and/or attenuations of the x-rays with or by the subject 28. The x-ray imaging may be an imaging modality. It is understood that other imaging modalities are possible, such as other high energy beams, radio waves, magnetic fields, etc.

Figure 2:
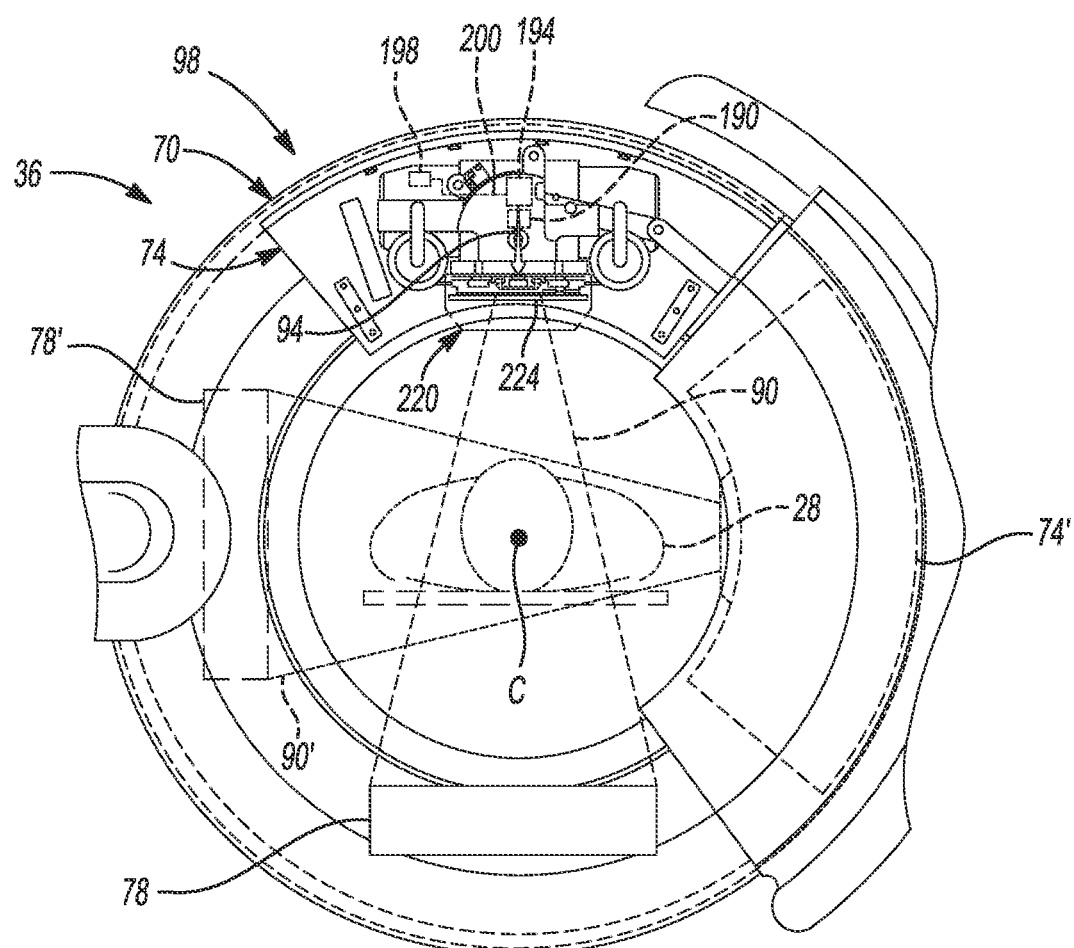
FIG. 2 is a detailed schematic view of an imaging system with a source and detector configured to move around a subject, according to various embodiments.

Thus, in the imaging system 36, the source unit 74 may be an x-ray emitter that can emit x-rays at and/or through the patient 28 to be detected by the detector 78. As is understood by one skilled in the art, the x-rays emitted by the source 74 can be emitted in a cone 90 along a selected main vector 94 and detected by the detector 78, as illustrated in FIG. 2. The source 74 and the detector 78 may be positioned moveable or fixed to a rotor that may also be referred to together as a source/detector unit 98, especially wherein the source 74 is generally diametrically opposed (e.g., 180 degrees (°) apart) from the detector 78 within the gantry 70. The rotor may allow the source and detector to move around the patient 28 within the gantry 70.

The imaging system 36 may move, as a whole or in part, relative to the subject 28. For example, the source 74 and the detector 78, such as on the rotor, can move around the patient 28, e.g., a 360° motion, spiral, portion of a circle, etc. The movement of the source/detector unit 98 within the gantry 70 may allow the source 74 to remain generally 180° opposed (such as with a fixed inner gantry or rotor or moving system) to the detector 78. Thus, the detector 78 may be referred to as moving around (e.g., in a circle or spiral) the subject 28 and it is understood that the source 74 is remaining opposed thereto, unless disclosed otherwise.

Also, the gantry 70 can move isometrically (also referred as "wag") relative to the subject 28 generally in the direction of arrow 100 around an axis 102, such as through the cart 60, as illustrated in FIG. 1. The gantry 70 can also tilt relative to a long axis 106 of the patient 28 illustrated by arrows 110. In tilting, a plane of the gantry 70 may tilt or form a non-orthogonal angle with the axis 106 of the subject 28.

The gantry 70 may also move longitudinally in the direction of arrows 114 along the line 106 relative to the subject 28 and/or the cart 60. Also, the cart 60 may move to move the gantry 70. Further, the gantry 70 can move up and down generally in the direction of arrows 118 relative to the cart 30 and/or the subject 28, generally transverse to the axis 106 and parallel with the axis 102. Movements and actions may include those disclosed in U.S. Pat. No. 11,213,357, incorporated herein by reference.

In addition or alternatively, the imaging system 36 as a whole may move. For example, a drive system may be provided to power movement of the mobile cart 60. The cart 60 may include a motor as the drive system that powers or drives at least one or more wheels 61. It is understood that nay appropriate wheels and/or drive system may be provided to move the cart 60, including those disclosed in U.S. Pat. No. 11,344,268, incorporated herein by reference. Thus, the cart 60 carrying the gantry 70 may move in various directions and/or motions such as also along or in the direction of the arrows, 100, 110, 114, and 118. This may allow the imaging system 36 to move any selected distance relative, such as relative to the subject 28.

The movement of the imaging system 36, in whole or in part, is to allow for positioning of the source/detector unit (SDU) 98 relative to the subject 28. The imaging device 36 can be precisely controlled to move the SDU 98 relative to the subject 28 to generate precise image data of the subject 28. The imaging device 36 can be connected to the processor 56 via a connection 120, which can include a wired or wireless connection or physical media transfer from the imaging system 36 to the processor 56. Thus, image data collected with the imaging system 36 can be transferred to the processing system 56 for navigation, display, reconstruction, etc.

The source 74, as discussed herein, may include one or more sources of x-rays for imaging the subject 28. In various embodiments, the source 74 may include a single source that may be powered by more than one power source to generate and/or emit x-rays at different energy characteristics. Further, more than one x-ray source may be the source 74 that may be powered to emit x-rays with differing energy characteristics at selected times.

According to various embodiments, the imaging system 36 can be used with an un-navigated and/or navigated procedure. In a navigated procedure, a navigation system 128 may include various portions such as a localizer and/or digitizer, including either or both of an optical localizer 130 and/or an electromagnetic localizer 138 can be used to generate a field and/or receive and/or send a signal within a navigation domain relative to the subject 28. The navigated space or navigational domain relative to the subject 28 can be registered to the image 40. Correlation, as understood in the art, is to allow registration of a navigation space defined within the navigational domain and an image space defined by the image 40. In other words, a translation map between patient or navigation space may be made relative to an image space of the image 40. The navigation system 128 may further include the processor 56 and/or memory 58 and/or other appropriate processor modules and memory to execute instructions to assist in the translation map, registration, tracking tracking devices with the respective localizers, and the like. A patient tracker or dynamic reference frame 140 can be connected to the subject 28 to allow for a dynamic registration and maintenance of registration of the subject 28 to the image 40.

The patient tracking device or dynamic registration device 140 and an instrument 144 can then be tracked relative to the subject 28 to allow for a navigated procedure. The instrument 144 can include a tracking device, such as an optical tracking device 148 and/or an electromagnetic tracking device 152 to allow for tracking of the instrument 144 with either or both of the optical localizer 130 or the electromagnetic localizer 138. A navigation/probe interface device 158 may have communications (e.g., wired or wireless) with the instrument 144 (e.g., via a communication line 156), with the electromagnetic localizer 138 (e.g., via a communication line 162), and/or the optical localizer 130 (e.g., via a communication line 166). The interface 158 can also communicate with the processor 56 with a communication line 168 and may communicate information (e.g., signals) regarding the various items connected to the interface 158. It will be understood that any of the communication lines can be wired, wireless, physical media transmission or movement, or any other appropriate communication. Nevertheless, the appropriate communication systems can be provided with the respective localizers to allow for tracking of the instrument 144 relative to the subject 28 to allow for illustration of a tracked location of the instrument 144 relative to the image 40 for performing a procedure.

Registration may be performed in various manners. For example, the tracked pose of the imaging system 36 relative to the subject 28 at the time of image data acquisition may allow knowledge of a pose of the image and a related image space coordinate system relative to the subject. Further, similar or identical fiducial points may be identified and tracked on the subject 28 and within the image 40. Various known component registration methods include those disclosed in U.S. Pat. No. 11,138,768, incorporated herein by a reference. Thus, a translation map may be generated to allow a tracked pose of an instrument (e.g., that may be any appropriate member) to be illustrated as a graphical representation relative to (including superimposed thereon) the image 40. Also, the relative pose of the imaging system 36 and the subject 28 may be known or determined.

One skilled in the art will understand that the instrument 144 may be any appropriate instrument, such as a ventricular or vascular stent, spinal implant, neurological stent or stimulator, ablation device, or the like. The instrument 144 can be an interventional instrument or can include or be an implantable device. Tracking the instrument 144 allows for viewing a pose (including x,y,z position and orientation) of the instrument 144 relative to the subject 28 with use of the registered image 40 without direct viewing of the instrument 144 within the subject 28.

Further, the imaging system 36, such as the gantry 70, can include an optical tracking device 174 and/or an electromagnetic tracking device 178 to be tracked with the respective optical localizer 130 and/or electromagnetic localizer 138. Accordingly, the imaging device 36 can be tracked relative to the subject 28 as can the instrument 144 to allow for initial registration, automatic registration, or continued registration of the subject 28 relative to the image 40. Registration and navigated procedures are discussed in the above incorporated U.S. Pat. No. 8,238,631, incorporated herein by reference. Upon registration and tracking of the instrument 144, a graphical representation 180, also referred to as an icon, may be displayed relative to, including overlaid on, the image 40. The image 40 may be an appropriate image and may include a long film image, 2D image, 3D image, or any appropriate image as discussed herein.

With continuing reference to FIG. 2, according to various embodiments, the source 74 can include a single assembly that may include a single x-ray tube 190 that can be connected to a switch 194 that can interconnect a first power source 198 via a connection or power line 200. As discussed above, x-rays can be emitted from the x-ray tube 190 generally in the cone shape 90 towards the detector 78 and generally in the direction from the x-ray tube 190 as indicated by arrow, beam arrow, beam or vector 94. The switch 194 can switch power on or off to the tube 190 to emit x-rays of selected characteristics, as is understood by one skilled in the art. The vector 94 may be a central vector or ray within the cone 90 of x-rays. An x-ray beam may be emitted as the cone 90 or other appropriate geometry. The vector 94 may include a selected line or axis relevant for further interaction with the beam, such as with a filter member, as discussed further herein.

The subject 28 can be positioned within the x-ray cone 90 to allow for acquiring image data of the subject 28 based upon the emission of x-rays in the direction of vector 94 towards the detector 78. The x-ray tube 190 may be used to generate two-dimensional (2D) x-ray projections of the subject 28, including selected portions of the subject 28, or any area, region or volume of interest, in light of the x-rays impinging upon or being detected on a 2D or flat panel detector, as the detector 78. The 2D x-ray projections can be reconstructed, as discussed herein, to generate and/or display three-dimensional (3D) volumetric models of the subject 28, selected portion of the subject 28, or any area, region or volume of interest. As discussed herein, the 2D x-ray projections can be image data acquired with the imaging system 36, while the 3D volumetric models can be generated or model image data.

For reconstructing or forming the 3D volumetric image, appropriate techniques include Expectation maximization (EM), Ordered Subsets EM (OS-EM), Simultaneous Algebraic Reconstruction Technique (SART) and Total Variation Minimization (TVM), as generally understood by those skilled in the art. Various reconstruction techniques may also and alternatively include machine learning systems and algebraic techniques. The application to perform a 3D volumetric reconstruction based on the 2D projections allows for efficient and complete volumetric reconstruction. Generally, an algebraic technique can include an iterative process to perform a reconstruction of the subject 28 for display as the image 40. For example, a pure or theoretical image data projection, such as those based on or generated from an atlas or stylized model of a "theoretical" patient, can be iteratively changed until the theoretical projection images match the acquired 2D projection image data of the subject 28. Then, the stylized model can be appropriately altered as the 3D volumetric reconstruction model of the acquired 2D projection image data of the selected subject 28 and can be used in a surgical intervention, such as navigation, diagnosis, or planning. The theoretical model can be associated with theoretical image data to construct the theoretical model. In this way, the model or the image data 40 can be built based upon image data acquired of the subject 28 with the imaging device 36.

With continuing reference to FIG. 2, the source 74 may include various elements or features that may be moved relative to the x-ray tube 190. In various embodiments, for example, a collimator 220 may be positioned relative to the x-ray tube 190 to assist in forming the cone 90 relative to the subject 28. The collimator 220 may include various features such as movable members that may assist in positioning one or more filters within the cone 90 of the x-rays prior to reaching the subject 28. One or more movement systems 224 may be provided to move all and/or various portions of the collimator 220. Further, as discussed further herein, various filters may be used to shape the x-ray beam, such as shaping the cone 90, into a selected shape prior to reaching the subject 28. In various embodiments, as discussed herein, the x-rays may be formed into a thin fan or plane to reach and pass through the subject 28 and be detected by the detector 78.

Accordingly, the source 74 including the collimator 220 may include a filter assembly, such as that disclosed in U.S. Pat. No. 10,881,371 to Helm et al., incorporated herein by reference. The filter assembly may include one or more portions that allow for moving a filter relative to the x-ray tube 190 to shape and/or position the x-rays prior to reaching the subject 28. For example, the filter assembly may include a slotted filter.

As discussed above, the imaging system 36 may move relative to the subject 28. In various embodiments, the imaging system 36 may move automatically, such as with the powered wheel 61. The imaging system 36 may move based on a known current pose of the imaging system 36 relative to the subject and a selected final pose. Additionally or alternatively, the imaging system 36 may be selected to move to a selected final pose in space that may be tracked with the tracking or navigation systems, as discussed above. The tracking or navigation systems may allow, as discussed herein, movement of the imaging system 36 in space and/or relative to the subject 28.

As discussed above, the imaging system 36 may be tracked with a selected tracking system, which may include the optical tracker 130. It is understood, however, that any appropriate tracking system may be used such as the EM tracking system 138. Therefore, the discussion herein regarding the optical tracking system or a tracking system in general will be understood to refer to any appropriate tracking system. Further the tracking system may be operable with one or more processors, such as the processor system 56 to allow for a determination of a pose of one or more items, such as of the imaging system 36, including the gantry 70 or portions thereof, the subject 28, and/or portions of the subject, such as the vertebrae or spine 28s.

Figure 3:
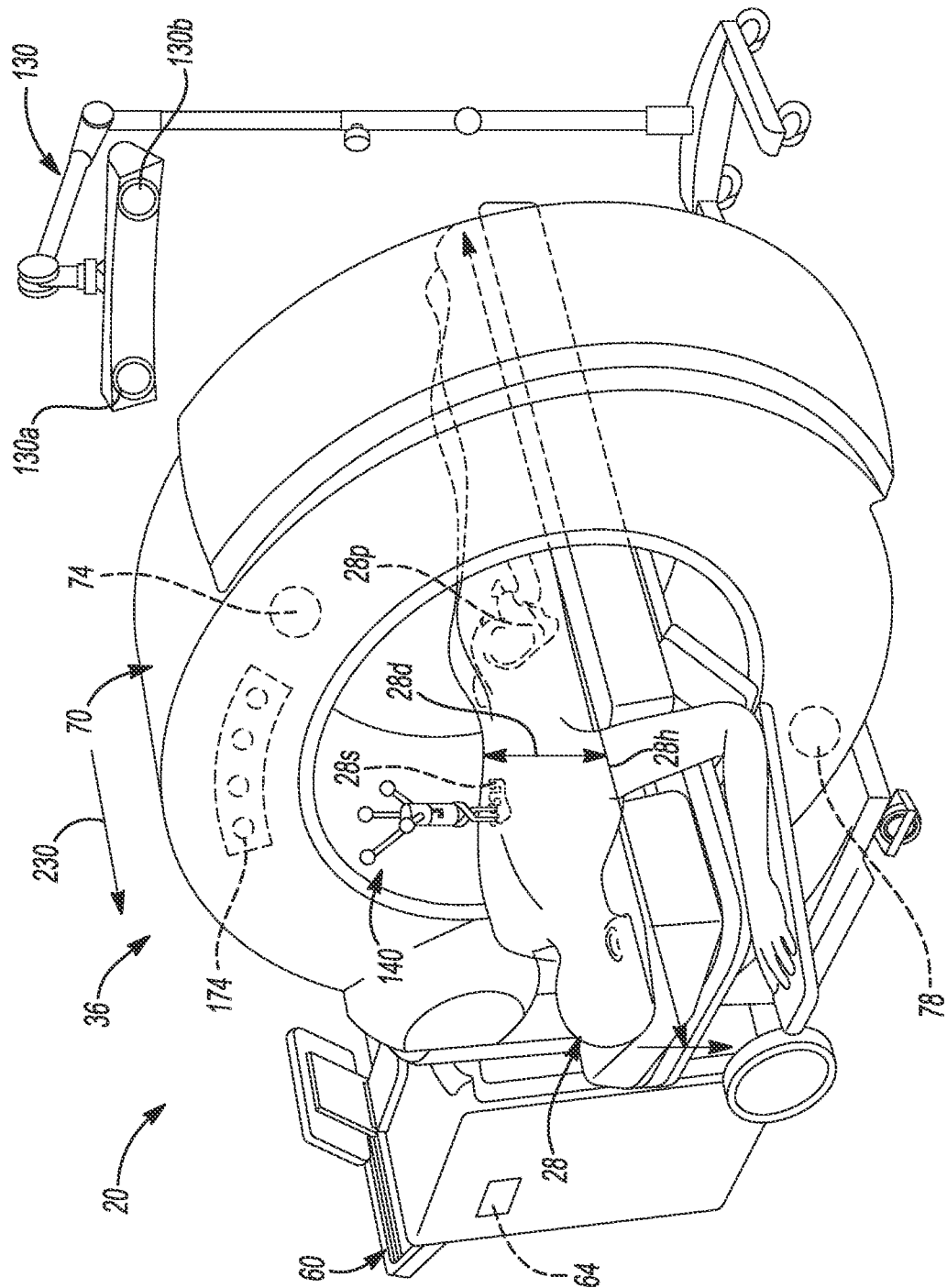
FIG. 3 is an environmental view of the operating theatre including an imaging system and the subject tracker and a tracking system, according to various embodiments.

Turning reference to FIG. 3, for example, the imaging system 36 is illustrated. The imaging system 36 includes the cart 60 and the gantry 70. Associated with the imaging system 36, such as connected to the gantry 70, may be the optical tracking system or member 174. The optical tracking device 174 may be any appropriate tracking device, as discussed above but may be trackable with an appropriate or selected tracking system, such as the optical localizer 130. Briefly, the optical localizer 130 may include one or more optical receivers which may include visible light receivers, infrared light receivers, or other appropriate receivers such as a first receiver 130a and a second receiver 130a. The localizer 130 may track the tracking device 174 over time to determine a position of the tracking device 174 and portions associated therewith, such as the gantry 70, the imaging system 36 as a whole, and portions within the gantry 70. As discussed above, the imaging system 36 may allow for precise positioning of portions of the imaging system 36 including the cart 60, the gantry 70, and the source and detector 74, 78 within the gantry 70. Therefore, a pose of image data collected with the imaging system 36 may be known. As the imaging system 36 is tracked by and/or in communication with the navigation system 128 the pose of the image data is known by the navigation system 128 associated with the tracking localizer 130.

The subject 28 may also have a tracking device associated therewith, such as the tracking device 140. The tracking device 140 may also be referred to as a patient tracker or dynamic reference frame (DRF) 140. The tracking localizer 130 may also track the patient tracker 140. The patient tracker 140 may be connected to the subject 28 in a selected or known position, such as relative to the spine 28s. Therefore, the tracking system included with the navigation system 128, including the localizer 130, is used to determine a position of the subject 28. In particular the patient tracking device 140 is connected to a specific portion of the subject 28, such as a vertebrae 28v.

As discussed further herein, therefore, the processor 56 may acquire tracking information from the localizer 130 of the position of the tracking device 174 associated with the imaging system 36 and the patient tracking device 140 associated with the subject 28. Therefore, the positions of both of the subject 28 and the imaging system 36 may be known and the relative positions of the subject 28 and the imaging system 36 may be determined. A current pose, such as one illustrated in FIG. 3 of the subject 28 and the imaging system 36, may be known or determined. A selected or future pose or position of the imaging system 36 relative to the subject 28 may also be determined. For example, a selected portion of the subject 28, such as a pelvis 28p, may be imaged. If the imaging system is positioned to image the pelvis 28p determination may be made based upon a known or current relative pose of the imaging system 36 to the subject 28. If the imaging system is not determined to be in a position to image the pelvis 28p, a determination of a position to image the pelvis may be made. The position may be determined automatically, as further discussed herein, manually by the user 24, or combinations thereof. Nevertheless, the imaging system 36 may be operated to move to a position to image the pelvis 28p based upon the tracked position of the subject 28 including the pelvis 28p and a tracked position of the imaging system 36, such as with the respective tracking devices 140, 174.

Figure 4:
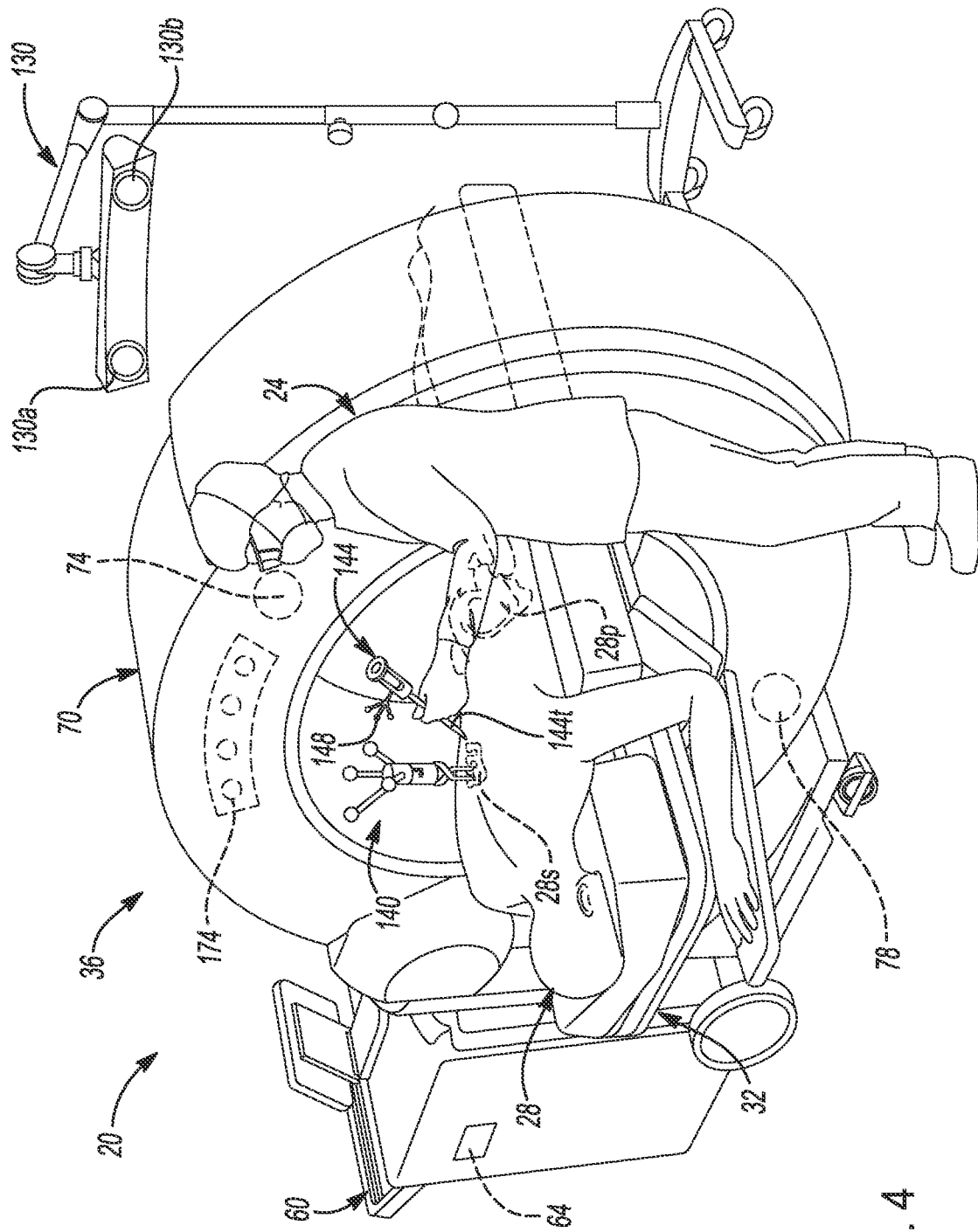
FIG. 4 is an environmental view of the operating theatre with an imaging system and a tracking system to track the imaging system and an instrument, according to various embodiments.

Turning reference to FIG. 4, the localizer 130 may again be configured and positioned to track the tracking device 174 to determine the pose of the imaging system 36. The user 24 may alter or manipulate an instrument, such as the instrument 144 that includes the tracking device 148. The tracking device 148 may also be tracked with the localizer 130. Thus, the position of the instrument 144, including a distal tip 144t thereof may be determined and a relative position thereof. The user 24 may move the instrument 144 to selected positions relative to the subject 28. For example, the user 24 may move the instrument 144, such as the distal tip 144t thereof, to identify a position on the subject 28. The user 24 may move the instrument 144 to contact a portion of the pelvis 28p and/or a portion of the subject 28 relatives of the pelvis 28p. In this manner, the user 24 may instruct the system to identify the position of the instrument 144 as a position to be imaged. The localizer 130 may track the position of the instrument 144 with the tracking device 148 to determine the position of the instrument 144 used by the user 24 to identify a position to be imaged. Similar to the patient tracking device 140, discussed above, the system may then determine a relative position of the imaging system 36 and the patient 28 to assist in determining whether the imaging system 36 is at a position to image selected portions of the subject 28 or needs to be moved. If the imaging system needs to be moved, the processor, such as the navigation processor 56 may be used to determine a final position to image the portion selected by the user 24.

The instrument 144 may also be moved by the user 24 and tracked with the navigation or tracking system, including the localizer 130, to identify a specific position. For example, the user 24 may move the instrument 144 to touch a specific portion of the subject 28, such as a specific vertebra of the subject 28. The user 24, for example, may move the instrument 144, including the distal tip 144t, to touch vertebrae 28v, such as T4 even if the patient tracker 140 is connected to the subject 28. While the patient tracker 140 may be positioned or connected to a portion of the spine 28s, the patient tracker 140 may not be connected to the vertebrae 28v. Therefore, the imaging system 36 may be tracked within the imaging system tracker 174 relative to the instrument 144, and the instrument 144 may be positioned on a specific portion of the subject 28 such as the vertebrae 28v. The imaging system 36 may then have a position determined to image selected portions of the subject, such as the vertebrae 28v that may be identified or selected with the instrument 144. The imaging system 36 may be moved to a substantially precise position to image of a specific portion of the subject 28 that is identified specifically and directly by the user 24.

As discussed further herein, a selective process or workflow may be used to determine positioning of the imaging system 36 relative to the subject 28. The position of the imaging system 36 at any given time may be determined based upon tracking the imaging tracking device 174. The position of the subject 28 may be determined or portions thereof based upon tracking a selected portion relative to the subject, such as the patient tracker 140 and/or the instrument 144. Additionally or alternatively various known or assumed dimensions of the subject 28 and/or portions relative thereto, such as the table or support 32, may be used to assist in determining a possible motion of the imaging system 36. The items in the theater 20 may be identified such that a selected final pose or imaging position may be achieved while avoiding collisions with portions in the operating arena or area 20. For example, an actual or estimated geometry or dimensions of the subject 28 may be entered into the navigation system 128 and evaluated by a processing system, such as the imaging system processing system 64. For example, the subject 28 may be measured to have a selected height 28h and/or depth 28d. The dimensions of the subject 28 may be used to assist in determining a possible area that is collision free for movement of imaging system 36. Further, the patient tracker 140 may be tracked directly. Other portions that may also be avoided or should be avoided may also be identified, such as by tracking the instrument 144 moved by the user 24. Various estimations may also be made, such as estimating a size of a portion of the subject, such as a dimension of individual vertebrae, to assist in moving the imaging system to a substantially precise selected position for imaging the subject 28.

With continuing reference to FIGS. 1 through 4 and additional reference to FIG. 5A (combined reference to 5A1 and 5A2) and FIG. 5B, a process of moving the imaging system 36 to acquire selected images of the subject 28 are described. As understood by one skilled in the art, the flowcharts in FIGS. 5A and 5B may be included or provided as instructions that are executed by a selected processor, such as the processor 64 of the imaging system 36 and/or the processor system 56 of the navigation system 128. The processor may execute the instructions based upon tracking selected portions, such as the imaging tracking device 174, the patient tracker 140, or the instrument tracker 148, combinations thereof or other selected trackers. The flowchart and the associate processes may allow for the imaging system 36 to be moved substantially automatically by driving and moving selected portions of the imaging system 36, such as the entire imaging system 36 including the cart 60 thereof, and/or with or without inputs from the user 24 or other selected manual inputs.

With initial reference to FIG. 5A, a process 200 is illustrated. The process 200 may begin at start Block 204. Thereafter, a determination of whether a subject tracker is on the subject may be made in Block 208. The determination in Block 208 may be performed in the various manners. For example, one or more of the localizers, such as the optical localizer 130 may scan an area to determine whether a patient tracker, such as the patient tracker 140, is sensed. Again, the following discussion of optical tackers and the optical localizer 130 may be applied to any appropriate tracker and any appropriate localizer. Further, the user, such as the user 24, may input to an appropriate system such as the navigation system 128 that a patient tracker is present and that the tracking system should locate the patient tracker 140.

If no subject tracker is determined in Block 208, a NO path 210 may be followed to a sub-process 214, illustrated in FIG. 5B and discussed further herein. If a determination is made in Block 208 that a patient tracker or subject tracker is present, a YES path 220 is followed. The YES path 220 leads to determining a pose of the patient tracker, also referred to as a DRF, in Block 224. The determination of the pose of the DRF in Block 224 may be performed by the navigation system 128, as is generally understood by one skilled in the art. Briefly, with an optical tracking system, the optical localizer 130 including the two detectors 130a, 130b may be used to triangulate the pose of the patient tracker 140. Determining the pose of the DRF 140 with other appropriate tracking systems is understood by one skilled in the art. Therefore, the pose of the DRF is determined in Block 224. After determining the pose in Block 224, a sub-process 228 may be entered. The sub-process 228 may include moving the imaging system to the subject. In moving the imaging system to the subject in Block 228, a gross movement of the imaging system 36 may occur. For example, the imaging system may move to position the gantry 70 around the subject, such as generally in the direction of arrow 230 in FIG. 3. The movement of the imaging system 36 may be any appropriate movement as discussed herein.

In the sub-process 228, a determination of a pose of the imaging system is made in Block 232. The determination of the pose of the imaging system 36 may be based upon tracking of the imaging system tracker 174. The imaging system tracker 174 may be tracked within the appropriate tracking system. It is understood, however, that the subject tracker 140 and the imaging system tracker 174 need not be tracked with the same tracking system. The two tracking devices may be tracked with different tracking systems and the two tracking systems may be coordinated relative to one another such as disclosed in U.S. Pat. No. 11,135,025, incorporated herein by reference. Therefore, the tracking systems may have coordinated spaces or origins such that a movement or pose in one may be translated to the other.

After determining the pose of the imaging system in Block 232, instructions may be generated and/or sent to move the imaging system to be near or adjacent to the subject based upon the determined pose of the DRF in Block 224. Instructions may be sent to move the imaging system in Block 236 in the sub-process 228. The instructions may include an amount of movement and directions of movement. The amount of movement may be an angular amount and/or a distance amount. Further, the directions may include a final coordinate and/or a specific amount of linear and/or angular movements that are to be carried out to move the imaging system near or adjacent to the subject. In various embodiments, moving the imaging system 36 to be near or adjacent to the subject 28 may include moving the gantry 70 to at least partially surround or be positioned within a selected distance of the subject 28. In various embodiments, movement of the imaging system 36 to be near or adjacent to the subject 28 may include moving of the imaging system such that an isocenter C of the imaging system 36, such as an isocenter of the gantry 70, surrounds the pose of the DRF determined in Block 224. The imaging system may be moved relative to the subject 28 at least in a gross or initial placement substantially automatically based upon a determined pose of the DRF in Block 224 and the determined pose of the imaging system in Block 238 and instructions that will move the imaging system to be near the patient Block 236.

It is also understood that the imaging system may be moved substantially manually, such as by the user 24, to be positioned at least at an initial or gross position relative to the subject 28. The automatic system, however, may allow for substantially automatic movement of the imaging system relative to the subject 28, according to various embodiments. Further, the imaging system may then be positioned relative to the subject 28 to image selected portions of the subject 28. In various embodiments, for example, a region-of-interest (ROI) may be recalled and/or selected in Block 240. The ROI may include a portion of the subject 28. For example, a specific vertebra of the spine 28s may be identified as the ROI in Block 240. The ROI may be recalled based upon planning, procedure, and/or input by the user 24. The ROI may also be identified relative to the subject tracker 140. For example, the ROI may include the portion to which the DRF 140 is connected, a position relative to the DRF or the like.

The ROI may be recalled in Block 240 and/or input by the user. Thereafter, a determination of a pose of the ROI relative to the DRF may be made in Block 244. A determination of the pose of the DRF relative to the ROI may include determining a distance and/or orientation of the ROI relative to the DRF 140. For example, as noted above, the DRF 140 may be connected to a selected vertebra, such as a lumbar vertebra, including L1. The ROI may include various other vertebrae that do not include the vertebra that is connected to the DRF 140 and/or does include at least of the vertebrae to which the DRF 140 is connected and other vertebrae. For example, the ROI may include various thoracic vertebrae including T0 and T11, and/or other lumbar vertebrae such as L4 and L5.

The determination of the pose of the ROI relative to the DRF 140 is based upon various information. The information may include a geometry and size of various portions of the subject 28, such as a geometry and size of each of the vertebra based upon pre-acquired image data of the subject 28. Further, atlas information may be used to determine a distance of various selected portions of the ROI relative to the DRF 140. For example, an atlas may include average information of a population of subjects that may be similar to the subject 28. The atlas may include a database of information related to a subject 28 based on size (e.g., height), subject gender, prior subject procedures, and the like. Nevertheless, the determination of the pose of the ROI relative to the DRF may be based upon only information from the subject 28, atlas information that relates to the subject 28, input from the user 24, or combinations thereof.

After determining a pose of the ROI relative to the DRF, a determination of a current pose of the imaging system via the imaging system tracker 174 may be made in Block 248. As discussed above, the ROI relative to the DRF allows the tracking system to determine a pose of a feature relative to the tracked portion that is tracked with the DRF. Further, the imaging system 36 is tracked with the imaging system tracker 174. Therefore, the pose of the imaging system 36 and the pose of the ROI may both be determined. The two poses may be determined with the tracking system, including the localizer 130, such as with a navigation processor 56 as is generally understood by one skilled in the art.

Based upon the determination of the current pose of the imaging system in Block 248, a determination of whether the imaging system's current pose is appropriate for imaging the recalled or selected ROI is made in Block 252. Generally, the ROI to be imaged and whether the imaging system is in or at an appropriate position based on a predetermined position of the imaging system and/or known the possible movements of the imaging system to achieve the selected pose. For example, if the ROI or selected portion of the subject 28, such as the selected vertebrae, is at the isocenter C of the imaging system 36, the determination may be that the imaging system is at the appropriate pose for acquiring image data. Further, known ability to acquire image data relative to the iso-center of the imaging system may be used to determine whether the imaging system is that the appropriate pose. Therefore, the system, such as the imaging system including the imager processor 64, may execute instructions to determine whether the imaging system is at an appropriate pose to collect image data of the ROI.

If the imaging system is at the appropriate position, a YES path 256 may be followed. The processes 200 made then End in Block 260. After following the YES path 256, the image data may be acquired. However, the process 200 may be generally for positioning the imaging system to acquire image data. Therefore, one skilled in the art will understand that the imaging system 36 may acquire image data at the appropriate pose.

If a determination is made that the imaging system is not at the appropriate pose, a NO path 264 may be followed. The NO path 264 may go to an optional determination or recalling of a procedure pose in Block 268. For example, recalling the procedure pose may include recalling the positioning of one or more screws in the vertebrae. The procedure pose may be recalled in Block 268 such as being input by the user 24, based upon prior tracking of instruments during the procedure, or based upon a planned procedure. For example, planning may be performed with prior image data and the image data may be registered to the subject 28 and/or identify portions into the subject 28 relative to the DRF 140. Further, as understood by one skilled in the art, tracked instruments may be used to position portions into the subject 28. Therefore, the tracked instrument may be used to track placement of an implant, such as a screw into one or more vertebrae of the subject 28. Also or alternatively, the implant may be tracked to determine its pose. Regardless the tracked pose may be saved and recalled to determine a pose and related ROI of the subject for recalling Block 268.

Therefore, the ROI may be recalled based upon a prior procedure, input by the user, determined relative to the DRF, or in any appropriate manner. Regardless, the ROI may be used to determine a positioning of the imaging system 36 to acquire image data of the subject 38. A determination of movement of the imaging system to image the ROI is made in Block 272. Again, the determination of movement of the imaging system may include a final position of the imaging system 36 to acquire image data. The determination of movement may also include a determination of a plurality of individual discrete movements to reach the final position. Generally, the imaging system 36 includes information and/or internal instructions on how movements may occur to move the imaging system to a selected pose (e.g., received). Thus, once the ROI is determined, the imaging system 36 may automatically determine required movements to image the ROI.

After determining movements of the imaging system to image the ROI in Block 272, a determination of whether obstacles are present may be made in Block 276. A determination of whether obstacles are present may include a known geometry of the operating theater 20, tracked portions within the operating theater 20, such as the DRF 140, or other inputs. For example, the user 24 may identify obstacles and their respective poses. Further, the tracking system, such as the localizer 130, may track the DRF and the geometry of the subject 28 to which the DRF 140 is connected may be known. Therefore, a volume relative to the DRF may be determined as an obstacle zone. At least in this manner, obstacles may be identified within the operating theater 20.

If an obstacle is determined to be present, a YES path 278 may be followed to determine movements of the imaging system in Block 272. Therefore, the movement determination may be iterated until it is determined that no obstacles are present. It is further understood that during movement of the imaging system, the imaging system may have sensors that sense an obstacle. If an obstacle is sensed, the imaging system 36 may stop movement and a warning may be provided, such as via the display 44, and audible warning, or any appropriate warning. If no obstacles are determined to be present, a NO path 280 may be followed.

In following the NO path 280, a command may be sent to move the imaging system in Block 284. The command, as discussed above, may include specific directions to move the imaging system, or a command to move the imaging system to the pose to image the ROI. In various embodiments, the imaging system 36 includes internal instructions for movement to a selected pose and the discrete commands to move in Block 294 may include only a final pose to which the imaging system is to move. In various embodiments, however, the command to move may include specific movement instructions such as linear, rotational, angular, and like movements to move the imaging system 36 to the selected posed to image the ROI.

After the imaging system is at the selected pose, image data may optionally be acquired in Block 288. As discussed above, the process 200 and may include instructions and/or processes to move the imaging system to acquire selected image data at a selected pose. Acquisition of the image data in Block 288, therefore, is not required.

A determination may be made in Block 290 of whether additional image data is selected of the ROI. If additional image data is selected, a YES path 294 is followed to determine a current pose of the imaging system to Block 248. Therefore, the process 200 may iterate to acquire an appropriate amount of image data that may be selected by the user, selected by the system to ensure an appropriate amount of image data is acquired to generate selected images, or based upon other appropriate inputs. For example, the user 24 may select to generate a three-dimensional image of a selected portion of the subject. Therefore, the imaging system may acquire image data of the selected ROI in an appropriate manner and amount to acquire image data for the selected reconstruction. However, to ensure an appropriate amount of image data is collected, the imaging system may be required to move to more than one pose to acquire the appropriate image data. Therefore, the decision Block 290 may allow for the imaging system to move to a second pose to ensure an appropriate amount of image data is collected for the selected image data reconstruction.

If no additional image data is required or determined in Block 290, a NO path 298 is followed. The NO path 298 may be followed to an optional determination whether a refinement is needed in Block 300. Refinement may include identifying a specific portion of the subject 28 to be imaged. As discussed above, the ROI may be based upon various determinations, such as a position relative to the DRF 140, they recalled pose of an implant portion, or the like. Refinement, however, may also be performed as discussed further herein, such as in the sub-process 214. If no refinement is needed and determined in Block 300, a NO path 304 may be followed to end the procedure at Block 260. Ending the procedure at Block 260 may include those processes discussed above.

If refinement is needed or selected, a YES path of 310 may be followed. The refinement may include the sub-process 214, illustrated in FIG. 5B briefly discussed above. The process 200, after determining that no subject tracker is present in Block 208, may follow the NO path 210 to the sub-process 214. The sub-process 214 may allow for a determination of a selected and/or a refined portion (e.g., ROI) to be imaged by the imaging system 36. The refinement may be based upon a positioning of the instrument 144 that is tracked.

The instrument 144 may be moved by the user 24 relative to the subject 28. Therefore, the sub-process 214 may include a received command to track an instrument in Block 320. The receive track instrument command may be based upon an input by the user 24 and/or other appropriate commands. Once the instrument is tracked in the sub-process 214, in Block 324 an ROI is selected with the tracked instrument. As illustrated in FIGS. 1 and 4, the user 24 may move the instrument 144 relative to the subject 28. The user 24 may, for example, move the instrument to a selected portion of the pelvis 28p. As understood by one skilled in the art, the pelvis 28p is a large structure that may have various portions. The user 24 may select to image only selected portion of the pelvis and/or ensure that a high resolution of a reconstructed image is collected for at least a selected portion of the pelvis 28p. Therefore, the user 24 may move the instrument 144 to identify a portion of the subject 28 to be imaged as the ROI. The tracking system, including the localizer 130, may track the instrument, such as the tip 144t thereof. Thus, the ROI may be selected based upon the movement of the instrument 144. The pose of the instrument may be determined in Block 328. The determination of the tracked pose of the instrument may be used to select the ROI.

The sub-process 214 may then reenter the process 200 at the determination of the current pose of the imaging system in Block 248. The process 200 may determine the ROI in the various appropriate manners such as with the DRF 144, the tracked instrument 144, or any other appropriate manner as discussed above. Further tracking the instrument 144 may allow for a refinement and/or specific portion of the subject 28 to be imaged with the imaging system 36.

As noted above and illustrated according to the process 200 and sub-process process 214, the imaging system 36 may be moved relative to the subject 28 at any appropriate position. The imaging system 36 may be moved into a room, positioned relative to the subject in a first or initial position. The imaging system 36 may also move to final or intermediate selected positions based upon inputs from the user 24 or any appropriate inputs, such as recalled tracked poses of a procedure.

According to various embodiments, the imaging system 36 may be moved within the operating theater 20 based upon tracking with one or more localizers, such as the localizer 130. The operating theater 20 may have a large area or volume that may require more than one localizer. With reference to FIG. 6, the localizer 130 may include a first localizer 300 and a second localizer 304. Both the localizers 300, 304 may be in communication with the navigation system 128, such as the navigation system processor 56. Each of the localizers 300, 304 may have respective fields of view (FOV) that may also be referenced to a navigation space and/or coordinate space. A first FOV 306 of the localizer 300 and a second FOV 308 of the second localizer 304. In various embodiments, a common or fixed reference 312 may have one or more tracking portions 314 that are trackable with both of the localizers 300, 304. Therefore, the respective two localizers 300, 304 may have coordinate systems that are calibrated to allow points to be translated between one another to allow for a determination of a pose of the imaging system 36 when being viewed by either or both of the localizers 300, 304.

The imaging system 36 may also be moved from a first or initial position, as illustrated by the illustration of the imaging system 36a in FIG. 6 to a second or subsequent position illustrated by the imaging system 36b FIG. 6. According to various embodiments, the movement of the imaging system from the first position 36a to the second position 36b may be based upon identification of the various reference of vectors, poses of the reference of vectors within the navigation space which may include the operating theater 20, and/or the FOVs 306, 308. As discussed further herein, therefore, the imaging system 36 may be moved to a selected pose based upon tracking of the imaging system 36 with the navigation system including the localizers 300, 304 and/or the identification of vectors and space, such as relative to the subject 28, the patient tracker 140, and/or a reference tracker 320.

As discussed in detail herein, the navigation system 128 may be used to assist in guiding an automatic movement and positioning of the imaging system 36. The navigation system 128 can use one or more of the localizers 300, 304 to expand the field of view if needed. Automating the setting up of the imaging system 36 may reduce operation times and/or reduce manual input and/or individuals to operate and move the imaging system 36. In various embodiments, the navigation system 128 tracks the imaging system 36 current pose and ending pose and then commands the imaging system 36 to move to the destination along a calculated route using a measured or predefined reference vector.

Knowing the starting and ending position may not be enough for automatic positioning, since there would be infinite route to access the location. According to various embodiments, a selected (e.g., optimal or best) route is determined to avoid collisions in the operation room 20, and instructions (e.g., in an algorithm) are to be robust and selectively fast, with a real time feedback. Generally, the moving direction is parallel to the table 32.

After all of the selected localizers 300, 304 are calibrated, the field of view of the navigation system 128 could be considered as the sum of the field of view of all localizers 300, 304. The imaging system 36 could be guided to move inside the combined field of view region as long as both imaging system 174 and the reference frame is within the combined field of view region. The calibration of two or more localizers may be localizing (e.g., "viewing") a common reference marker 312 to determine a common origin and/or distance within the respective fields of view 306, 308.

It is further understood that a similar system may be used to calibrate multiple localizers of non-optical tracking systems and/or two or more types of tracking modalities, such as electromagnetic, sonar, etc.

According to various embodiments disclosed herein, a self-moving and positioning method includes localizers to track the imaging system 36. The imaging system 36 (e.g., O-Arm® imaging system) is a self or automatic moving and positioning capable mechanism that is able relative to a fixed and/or moveable a reference frame as a target. A reference vector may be required and may describe an operation table orientation. This information could come from specially designed reference frame, robotically moveable fixtures, and/or or manual input.

With reference to FIG. 6, the imaging system 36 may be within the FOV of either or both of the localizers 300, 304. The respective field of view 306, 308 allow for tracking the imaging tracking device 174 throughout the operating theater 20. Therefore, the imaging system 36 may move from a position that is away from the subject 28 and the table 32, is illustrated in the position 36*a*, to a position that his near or adjacent to the table 32 and the subject 28. The position of the subject may be determined with the subject tracker 140, as discussed above.

The localizers 300, 304 may "view" the various tracking devices including the imaging tracking device 174, the subject tracking device 140, and other appropriate tracking devices in the respective FOVs. For example, the common reference 312 may be viewed by both of the localizers 300, 304 to identify a common reference point or origin for both of the FOVs 306, 308. Further, the position and/or orientation of the table may be determined with the table or vector reference 320. Again, the common reference tracking device 312 may be used to translate a position pose from one FOV, such as the FOV 308 of the second localizer 304 to the FOV coordinate system of the first localizer 300. Therefore, the navigation system 128 may determine a pose of the table 32, the subject 28, or other appropriate portions even if it is in a FOV of only one of the localizers, such as the localizer 304. Additionally, as discussed above, the FOV may refer to or generally refer to a navigation space or coordinate space that may be identified by one or more of the localizers regardless of the type of localizer. Therefore, FOV, as discussed herein, is merely exemplary.

The navigation system 128 may determine a pose of the imaging system at any particular time, such as a current pose 36*a*. The navigation system may further determine various reference vectors to assist in moving the imaging system 36 to a selected pose, such as to the pose 36*b*, and/or pose 36*c* as illustrated in FIG. 7. Generally, the movement of the imaging system 36 may be based upon commands given to the imaging system 36 to move into selected positions and/or including instructions for movement. Nevertheless, the navigation system 128 may execute instructions, such as with the processor module 56, to determine the current and final pose of the imaging system. According to various embodiments, the pose of the imaging system may be referenced relative to any particular portion, such as an isocenter C that may be a center of the imaging system, such as of the annular gantry 70. The isocenter C may generally be positioned relative to the subject 28 to image selected portions (e.g., ROI) of the subject. The isocenter C, therefore, may be positioned to image the ROI of the subject, as discussed above in the process 200. The imaging system 36 may be moved to the selected position as discussed herein is illustrated in FIGS. 6 and 7 according to a process illustrated in FIG. 8.

Generally, as discussed further here and in the flowchart illustrated in FIG. 8, the various tracking devices may be used to identify or determine vectors that may be reference vectors for determining poses and/or possible movements and/or final poses relative to the subject 28. For example, the patient tracker 140 may include selected or identifiable trackable portions, such as a reference trackable portions 330 and 332. The reference portions 330, 332 may be used to identify a vector 336. The vector 336 may be used to determine an orientation of the subject 28 and/or an orientation of the table 32. The vector 336 may also be reference to as a target vector as may any vector relative to the subject, such as based on the table tracker 320. The trackers may also be referred to as target trackers. Additionally or alternatively, a table reference device 320 may include trackable portions 340 and 342 that may also be used to identify a reference vector 346. The reference to vector 346 may be parallel to the reference vector 336. It is understood that both of the referenced vectors 336, 346 need not be determined. Further, the reference vectors 336, 346 may be determined in any orientation relative to the table 32 and/or the subject 28. Also, the reference vectors 336, 346 may be referred to as target reference vectors and the respective tracking devices as target tracking devices. Generally, however, the subject 28 that may be imaged may be aligned along the axis 106 of the subject 28. Therefore, the reference vectors 336, 346 may be selected to be generally parallel thereto.

The reference vectors may be determined by determining a line and/or a segment along a path between selected tracking portions, such as the reference or special tracking portion 332, 332. The determined vectors may point in a selected orientation, such as superiorly or inferiorly relative to the subject 28. The vectors may be determined by the navigation system 128 to track the respective tracking portions in identifying a line and/or vector relative thereto.

An imaging device reference vector 350 may also be determined relative to the imaging tracking device 174. Again, the imaging tracking device 174 may include selected or unique tracking portions, such as the tracking portion 354 and 356. A line may then be determined between the selected tracking portions 354, 356. The imaging device reference vector 350 may be determined on the line and relative to the imaging system 36, such as toward the cart 60. Therefore, the imaging device reference vector 350 may be oriented relative to one or more of the reference vectors relative to the patient 28, such as the patient reference vector 336. Discussion herein of the patient reference vector 336 will be understood to relate to any appropriate reference vector regarding a orientation relative to the subject 28 for imaging thereof.

The navigation system 128, therefore, after determining the imaging device reference vector 350 and the subject reference vector 336 may determine initial and final poses of the imaging system 36. The navigation system 128 may also alternatively determine instructions for movements of the imaging system to achieve a selected final position, such as positioning the isocenter relative to a selected portion of the subject 28. The isocenter C of the imaging system 36 may be known relative to the imaging device reference vector 350. The isocenter C, therefore, may be positioned relative to the subject 28 and the patient reference vector 336 based at least on the known isocenter C of the imaging system 36 known relative to the imaging device reference vector 350. This allows, as is understood by one skilled in the art, the isocenter C to be navigated and tracked in the navigation space and relative to the subject.

The imaging system 36 may be moved to be in a position substantially parallel to the reference vector 336 and/or orthogonal to the reference of vector 336. As illustrated in FIG. 6, the second or subsequent position 36b includes the imaging system 36 generally parallel with the subject 28. The imaging system 36 may also be positioned in a subsequent position 36c, as illustrated in FIG. 7, such that to the imaging system reference vector 350 is substantially orthogonal to the subject reference vector 336. As illustrated by the three axes 360, the subject 28 may generally lie in a x-y plane. The reference vector 336 may extend from the origin of the axes 360. When selectively positioned, the reference vector 350 of the imaging system may generally be orthogonal to y-axis that defines the plane of the bed 32 and/or the subject 28. Thus, the navigation system 128 may mathematically determine a selected pose, such as the imaging system pose 36c as illustrated in FIG. 7 of the imaging system 36 relative to the subject 28.

With continuing reference to FIG. 6 and FIG. 7, a process 400 illustrated in a flowchart of FIG. 8 includes a process that may be incorporated into instructions and/or an algorithm to instruct or command the imaging system 36 to move it to a selected pose, which may be relative to the subject 28. Process 400 may begin at start Black 404. A plurality of the localizers, such as the localizers 300, 304, may be used to track various portions. If a plurality of localizers are used a sub-process 410 may optionally be entered. In the multiple localizer sub-process 410, a receiving of tracking data regarding a single reference frame at a first localizer occurs in Block 414. As discussed above and illustrated in FIG. 6, for example, the localizer 300 may track the single reference device 312 within its FOV 306. Then receiving tracking data regarding the single reference at an Nth localizer may occur in Block 416. The Nth localizer may be any appropriate number of localizers other than the first localizer. As illustrated in FIG. 6, the second localizer 304 may have the field of you 308 and also view the single reference 312. The second localizer 304 may be the Nth localizer.

As noted above, the FOVs illustrated in FIG. 6 may refer to or also be referred to as a navigation space. The navigation space may be relative to any one of a number of localizers, including the localizers 300, 304 or any other appropriate localizer such as the EM localizer 138. Nevertheless, a plurality of localizers may each have their own individual navigation space. After tracking the single reference in both the first and second localizer frames of reference or space in Blocks 414 and 416, a calibration of navigation space may occur in Block 420. The calibration of the navigation space of the first localizer and the Nth localizer may include a translation or identification of all points in space that may be within the navigation space of both of the localizers. In various embodiments, for example, both the localizers may identify the single reference 312 as an origin such that all points in the navigated space may be determined relative thereto. Thus, the navigation system 128 may be used to determine a pose of any point in all of the space relative to the single reference 312.

The process 400 also includes tracking the subject reference in Block 430. Tracking the subject reference in Block 430 may include tracking of the subject reference 140 and/or the table reference 320. The tracking of the subject reference in Block 430 allows for the determination of the position and such orientation of the subject 28 which, as noted above, may also relate to the table tracking device 320. Accordingly, discussion herein of tracking the subject reference and the related subject reference vector will be understood to relate to the table tracker 320 and that the tracker reference vector 346. Also, as discussed above, other appropriate reference trackers may be tracked and these are merely exemplary.

A determination of a reference vector relative to the subject is made in Block 434. As noted above, the DRF 140 may include selected tracking portions, such as the tracking portions 332, 332 to assist in identifying the subject reference vector 336. The subject reference vector 336 may be referenced relative to the subject 28. Again, the subject reference vector 336 may be identified as a vector toward an inferior portion of the subject 28. It is understood, however, that the subject reference vector 336 may be determined relative to any appropriate portion of the subject 28 and in any appropriate direction. The subject reference vector 336 may allow for a determination of a vector of a target area or a vector relative to the target area for moving the imaging system 36.

The imaging system tracking device is also tracked in Block 438. The imaging system tracking device 174 may be tracked with the appropriate localizer, such as one or both of the localizers 300, 304. The imaging system tracking device 174 may allow for determination of a pose of the imaging system 36. The imaging system, as discussed above, may include various portions such as the cart 60 and the gantry 70. The imaging system 36 may include components, such as the imaging system operating portions to identify poses of the gantry 70 relative to the cart 60. Therefore, tracking of the imaging tracking device 174 on the gantry separate from the cart 60 may also allow for a determination of a pose of the entire portion of the imaging system 36.

A determination of an imaging system reference vector 350 of the imaging system 36 is determined in Block 442. Again, as discussed above, the imaging system tracking device 174 may include trackable portions 354, 356 and to allow definition of the imaging system reference vector 350. The imaging system reference vector 350 allows for a determination of a vector relative to the imaging system 36. The imaging system reference vector 350 may therefore be used in a motion determination for moving the imaging system 36 relative to the subject 28, or any appropriate target point, and the subject reference vector 336. As discussed herein, as an example, the subject 28 and or portions thereof, such as the patient reference 140, maybe identified as a target points are posed. It is understood that any appropriate target point may be used in these are merely exemplary.

The navigation system 128 may determine a current pose of the imaging system and black 450. A current pose of the imaging system may include a specific pose of the isocenter C of the imaging system 36. Further, the current pose of the imaging system may include a determination of the origin of the imaging system reference vector 350 and also a direction of the vector 350. Therefore, the navigation system 128 may be able to identify an orientation of the imaging system 36 in the navigation space such as to determine the imaging system reference vector 350.

The process 400 and may also recall or determine a target pose in Block 454. The determined or recalled target pose may be related to the subject 28. As discussed above, the DRF 140 is positioned on the subject at a selected appropriate pose. For example, the DRF 140 may be positioned on a portion of the subject for a procedure and/or positioned at a pose on the subject relative to a pose of the procedure. Therefore, the target location or pose may be a distance from the DRF 140 but may be determined relative to the DRF 140. Further, the patient reference vector 336 may be determined relative to the DRF 140. The patient reference vector 336 may be used to identify both orientation of the subject 28 and an orientation of the target position relative to the DRF 140. A determined or recalled target pose in Block 454 may include a determination or recall of a specific portion including the DRF 140 and/or a pose of a portion relative to the patient reference and patient reference vector 336.

The process 400, as noted above, may include a determination of a final target pose in Block 454 and/or optional movement instructions. Accordingly, a determination of movement instructions may occur in Block 460. The determination of specific movement instructions may include those that would move the imaging system 36 from a current pose, such as the pose 36*a*, to a selected target pose, such as the illustrated target pose 36*c* in FIG. 7. The movement instructions may include an amount of movement and/or a direction or orientation of movement of the imaging system 36 to achieve the target pose. The movement instructions may include those to limit or eliminate a possibility of a collision during movement of the imaging system 36. As noted above, the navigation system 128 may track a pose of the subject 28, instruments within the operating theater 20, and other portions. Therefore, the navigation system 128 may identify regions or volumes that the imaging system 36 should not cross or impede upon. The movement instructions may include those areas or areas which the imaging system 36 should not pass. Further, the imaging system 36 may include instructions on how to move the imaging system 36 and the navigation system 128 may include or provide a final destination or pose. Therefore, the determination of movement instructions may occur in the imaging system processing system, discussed above.

The process 400 may also include sending movement instructions in Block 464. Sending the movement instructions may include transmitting the movement instructions in an appropriate manner from the navigation system 128 to the imaging system 36. The transmission may include various mechanisms was as a wireless transmission, wired transmission, a transmission with a memory medium (such as a solid-state memory device). The movement instructions, however, may be provided to the imaging system 36 in any appropriate manner.

The process 400 may also include or therefore include sending a target pose of the imaging system vector 350 relative to the subject reference vector 336 in Block 470. As discussed above, the reference vectors 350, 336 may be positioned relative to one another such as in a substantially parallel manner as illustrated in FIG. 6 at position 36*b* of the imaging system 36 or perpendicular orientation as illustrated in position 36*c* in FIG. 7. The imaging system 36 may be moved to the target pose in any appropriate manner and the navigation system 128 may transfer the target pose in any appropriate manner, as discussed above.

The process 400 can then include at least an optional determination of whether the imaging system is at a selected ROI or that The ROI is within the isocenter in Block 474. The isocenter C, as discussed above, may be positioned to acquire image date of the subject 28 in an inappropriate manner. According to various embodiments, including those discussed above, the ROI may be identified for a selected portion of the subject 28. Therefore, determination of the isocenter C or any appropriate portion of the imaging system is at or near the ROI may be made in Block 474. If it is determined that the imaging system's position, such as the isocenter, is appropriate in Block 474 a YES path 478 may be followed. Optionally, image data may be acquired in Block 482. Again, as noted above, the process 400 may be to position the imaging system 36 relative to the subject 28. Therefore, acquisition of the image data in Block 482 is optional. The process may then End in Block 490. Ending the process 400 in block 490 may include completing a procedure, acquiring image data, reconstructing a selected image, or any other appropriate portion.

If it is determined that the imaging system is not positioned with an isocenter or other portion at the ROI a NO path 494 may be followed. The NO path 494 may proceed to Block 500 that goes to Block 214 of process 200, illustrated in FIG. 5B. Pursuant to Block 214 of process 200 in Block 500 the system may receive appropriate inputs regarding positioning of the imaging system 36 relative to the subject 28. As noted above, various refinements and processes or steps may occur, such as the user 24 identifying a selected portion or having an instrument tracked relative to the subject 28. Thereafter, the process 200 may be followed to assist a refining positioning of the imaging system as discussed above.

Therefore, the imaging system 36 may be moved relative to the subject in an appropriate manner. The imaging system 36 may be moved substantially automatically based upon selected inputs and/or information received regarding the subject 28, a pose of the subject 28, and/or the imaging system 36, or other information. The various processes, including the process 200 and/or the process 400, may be used to position the imaging system 36 relative to the subject in a substantially automatic manner to assist in the positioning of the imaging device 36 relative to the subject 28. Therefore, the imaging system 36 may be positioned result of the subject 28 to acquire selected image data in an efficient manner that may reduce the time for positioning the imaging system and/or reduce the need or an amount of manual input. Further, the imaging system may substantially automatically recall information regarding a procedure to assist and automatically positioning the imaging system for various image data acquisitions, such as confirmation image data and the like.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Instructions may be executed by a processor and may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The apparatuses and methods described in this application may be partially or fully implemented by a processor (also referred to as a processor module) that may include a special purpose computer (i.e., created by configuring a processor) and/or a general purpose computer to execute one or more particular functions embodied in computer programs. The computer programs include processor-executable instructions that are stored on at least one non-transitory, tangible computer-readable medium. The computer programs may also include or rely on stored data. The computer programs may include a basic input/output system (BIOS) that interacts with hardware of the special purpose computer, device drivers that interact with particular devices of the special purpose computer, one or more operating systems, user applications, background services and applications, etc.

The computer programs may include: (i) assembly code; (ii) object code generated from source code by a compiler; (iii) source code for execution by an interpreter; (iv) source code for compilation and execution by a just-in-time compiler, (v) descriptive text for parsing, such as HTML (hypertext markup language) or XML (extensible markup language), etc. As examples only, source code may be written in C, C++, C#, Objective-C, Haskell, Go, SQL, Lisp, Java®, ASP, Perl, Javascript®, HTML5, Ada, ASP (active server pages), Perl, Scala, Erlang, Ruby, Flash®, Visual Basic®, Lua, or Python®.

Communications may include wireless communications described in the present disclosure can be conducted in full or partial compliance with IEEE standard 802.11-2012, IEEE standard 802.16-2009, and/or IEEE standard 802.20-2008. In various implementations, IEEE 802.11-2012 may be supplemented by draft IEEE standard 802.11ac, draft IEEE standard 802.11ad, and/or draft IEEE standard 802.11ah.

A processor, processor module, module or 'controller' may be used interchangeably herein (unless specifically noted otherwise) and each may be replaced with the term 'circuit.' Any of these terms may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Instructions may be executed by one or more processors or processor modules, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "processor module" as used herein may refer to any of the foregoing structure or any other physical structure suitable for implementation of the described techniques. Also, the techniques could be fully implemented in one or more circuits or logic elements.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of positioning an imaging system, comprising:
   determining an imaging system reference vector based on at least acquiring tracking information of an imaging system tracking device associated with the imaging system;
   determining a target reference vector based on at least acquiring tracking information of a target tracking device;
   acquiring tracking information of the imaging system reference vector and the target reference vector based at least on tracking the imaging system tracking device and tracking the target tracking device;
   determining a first relative position of the imaging system reference vector and the target reference vector;
   receiving an input of a region-of-interest (ROI) at which image data is selected to be acquired;
   determining a second relative position of the imaging system reference vector and the target reference vector to acquire the image data at the ROI;
   determining a path to move the imaging system to the determined second relative position of the imaging system reference vector and the target reference vector; and
   outputting the determined path to move the imaging system;
   the method further comprising:
   tracking a reference in a first navigation space of a first localizer;
   tracking the reference in a second navigation space of a second localizer; and
   calibrating the first navigation space and the second navigation space.

2. The method of claim 1, wherein the imaging system tracking device includes at least first trackable portions configured to define the imaging system reference vector;
   wherein the target tracking device includes at least second trackable portions configured to define the target reference vector.

3. The method of claim 2, wherein determining the imaging system reference vector includes determining a segment along a path having a direction between the first trackable portions;
   wherein the direction is a known orientation of the imaging system.

4. The method of claim 2, wherein determining the target reference vector includes determining a segment along a path having a direction between the second trackable portions;
   wherein the direction is a known orientation of at least the second trackable portions.

5. The method of claim 1, further comprising:
   defining a plane defined at least by the target reference vector;
   wherein determining the path to move the imaging system includes determining a path to place the determined imaging system reference vector perpendicular to at least one axis of the plane.

6. The method of claim 5, further comprising:
   defining another plane defined at least by the target reference vector;

wherein determining the path to move the imaging system includes determining a path to place the determined imaging system reference vector parallel to the at least one axis of the plane.

7. The method of claim 1, wherein calibrating the first navigation space and the second navigation space includes defining a single origin for both the first navigation space and the second navigation space.

8. The method of claim 1, wherein calibrating the first navigation space and the second navigation space includes defining a translation map between the first navigation space and the second navigation space.

9. The method of claim 1, further comprising:
   determining the first relative position of the imaging system reference vector and the target reference vector in the first navigation space; and
   determining the second relative position of the imaging system reference vector and the target reference vector in the second navigation space.

10. The method of claim 9, wherein determining the path to move the imaging system to the determined second relative position of the imaging system reference vector and the target reference vector includes moving the imaging system from the first navigation space to the second navigation space.

11. The method of claim 1, further comprising:
    operating a processor to execute instructions to determine the path to move the imaging system to the determined second relative position of the imaging system reference vector and the target reference vector.

12. The method of claim 1, further comprising:
    transmitting the determined path as movement instructions to the imaging system.

13. The method of claim 1, further comprising:
    receiving feedback regarding obstacles in the determined path to stop or change the path based on the received feedback.

14. The method of claim 1, further comprising:
    acquiring the image data at the determined second relative position of the imaging system reference vector and the target reference vector to acquire the image data at the ROI.

15. A system to position an imaging system, comprising:
    an imaging system tracking device associated with the imaging system and configured to move with the imaging system;
    a target tracking device;
    a tracking system configured to track the imaging system tracking device and the target tracking device, the tracking system includes:
        a first localizer configured to track a reference in a first navigation space; and
        a second localizer configured to track the reference in a second navigation space;
    a processor configured to execute instructions to:
        determine an imaging system reference vector based on at least acquiring tracking information of the imaging system tracking device;
        determine a target reference vector based on at least acquiring tracking information of a target tracking device;
        receive tracking information of the imaging system reference vector and the target reference vector based at least on tracking the imaging system tracking device and tracking the target tracking device from the tracking system;
        determine a first relative position of the imaging system reference vector and the target reference vector;
        receive an input of a region-of-interest (ROI) at which image data is selected to be acquired;
        determine a second relative position of the imaging system reference vector and the target reference vector to acquire the image data at the ROI;
        determine a path to move the imaging system to the determined second relative position of the imaging system reference vector and the target reference vector;
        output the determined path to move the imaging system; and
    wherein the processor executes further instructions to calibrate the first navigation space and the second navigation space.

16. The system of claim 15, wherein the imaging system tracking device includes at least first trackable portions configured to define the imaging system reference vector;
    wherein the target tracking device includes at least second trackable portions configured to define the target reference vector.

17. The system of claim 15, wherein the processor executes further instructions to define a plane at least by the target reference vector;
    wherein determining the path to move the imaging system includes determining a path to place the determined imaging system reference vector perpendicular to at least one axis of the plane.

18. The system of claim 13, wherein the imaging system is configured to acquire the image data at the determined second relative position of the imaging system reference vector and the target reference vector to acquire the image data at the ROI.

* * * * *